Nov. 20, 1956  H. O. WILSON  2,771,093
BLEEDER VALVE FOR HYDRAULIC BRAKE SYSTEMS
Filed Dec. 26, 1952

INVENTOR.
Harry O. Wilson
BY
ATTORNEY.

United States Patent Office 2,771,093
Patented Nov. 20, 1956

2,771,093

BLEEDER VALVE FOR HYDRAULIC BRAKE SYSTEMS

Harry O. Wilson, Seattle, Wash.

Application December 26, 1952, Serial No. 328,073

1 Claim. (Cl. 137—614.17)

This invention relates to hydraulic systems commonly employed on automotive vehicles and particularly the bleeder valve forming a part of such system and through the medium whereof the tubes and cylinders of the system are relieved of air.

The primary aim of this invention is to provide a bleeder valve for hydraulic brake systems for automobiles, which valve comprises novel and unique means for draining fluid from the system as air entrained therein is permitted to escape, all for the purpose of conditioning the entire hydraulic system for normal and efficient operation.

Another object of the invention is to provide a new article of manufacture that will serve as a bleeder valve for hydraulic brake systems and which article of manufacture comprises a specially-formed body having structure thereon for removably receiving one end of a flexible drain hose and means within the said body for preventing the entrance of air into the system during the time the bleeder valve is open and while fluid and air is passing therethrough.

A yet further aim of this invention is the provision of a bleeder valve for hydraulic brake system having parts so arranged as to permit a single person to condition the system by the removal of air therefrom and without danger of creating back-suction into the system while manipulating the brake pedal and master valve to bleed the parts of the system having objectionable air pockets therein.

Further aims of the invention will appear during the course of the following specification, referring to the accompanying drawing, wherein.

Heretofore, it has required more than one person to properly bleed the hydraulic brake system of automotive equipment because of the danger incident to drawing air into the system as the brake pedal is released. Under conventional practice, two men engage in bleeding a hydraulic brake system, one holding the brake pedal in a depressed position to force fluid outwardly through the bleeder valve while the other tightens the bleeder valve at a time when a sufficient amount of fluid and all of the air has been ejected.

Figure 1:
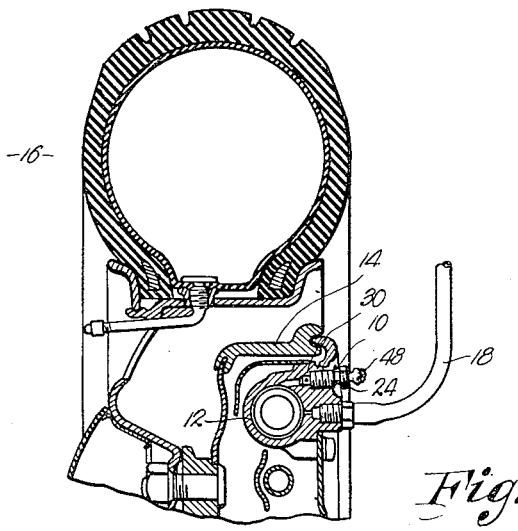
Fig. 1 is a fragmentary, sectional view through a portion of an automobile wheel assembly showing the bleeder valve embodying this invention in place.
Figure 5:
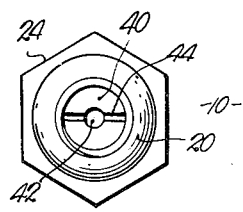
Fig. 5 is an end elevational view of the valve with the plug removed from operative position.

The form of the invention illustrated in the accompanying drawing comprises a bleeder valve assembly or body broadly designated by the numeral 10 that is disposed as illustrated in Fig. 1 to control the flow of fluid from the hydraulic brake system cylinder 12 or adjacent passageways which are usually mounted upon the brake assembly 14 of each automobile wheel 16. A tube 18 in connection with cylinder 12 joins the master cylinder of the hydraulic system (not here shown) and conveys fluid under pressure into cylinder 12 to actuate parts of the brake assembly 14.

The bleeder valve body 10 is cast or otherwise formed of a single mass of material to present a head 20 at one end and so contoured as to tightly retain but yieldably receive one end of a drain hose 22 that may extend to any suitable receptacle (not here shown) when the operator is forcing fluid from the system to eject air therefrom. This hose 22 is employed only when the bleeder valve 10 has been adjusted to allow fluid to flow therethrough from the hydraulic system including cylinder 12.

Figure 3:
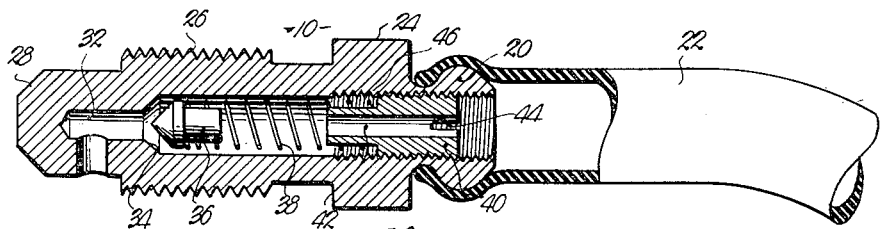
Fig. 3 is a similar sectional view but with the bleeder valve in an open condition.
Figure 4:
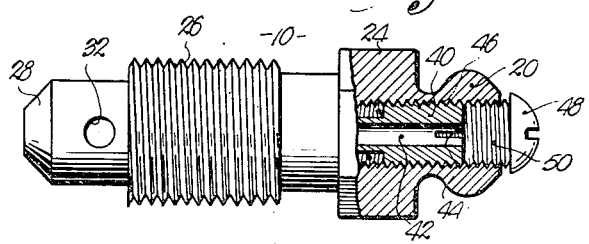
Fig. 4 is a fragmentary, sectional, side elevational view of the valve.

A wrench-engaging section 24 on body 10 is spaced inwardly from head 20, and screw threads 26 cooperate with threads formed in the brake structure for rotatably receiving body 10. The end of body 10 opposite from head 20 is fashioned to present an inclined surface 28 that cooperates with seat 30 formed on a part of the brake structure; and, when surface 28 is against this seat 30, no fluid can flow through bleeder valve 10. A longitudinal bore 32 formed in body 10 extends inwardly from the end thereof having head 20 thereon and terminates at the side of body 10, as illustrated in Figs. 2, 3 and 4.

A seat 34 formed on body 10 within bore 32 cooperates with valve 36 in controlling the flow of fluid through bore 32 under conditions hereinafter specified. This valve 36 is secured to one end of a coil spring 38. The other end of said spring 38 is secured to an externally-threaded plug 40 having a passageway 42 formed longitudinally therethrough and provided with a kerf 44, through the medium whereof a tool may engage plug 40 and move the same to and from an operative position.

Internal threads 46 formed on body 10 within bore 32 cooperate with the external threads on plug 40 when the parts of the valve are assembled. A dust plug 48 having a screw-threaded shank 50 is removably retained within the part of bore 32 having threads 46 therein, as clearly illustrated in Fig. 4. This plug insures that no foreign matter will enter bore 32 when the bleeder valve is in the position shown in Fig. 1 and under normal working conditions.

Figure 2:
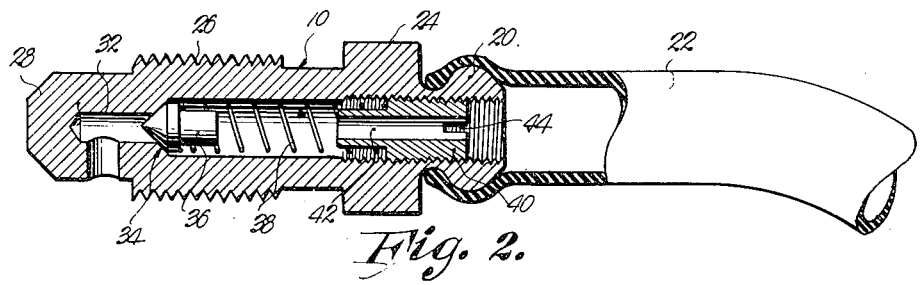
Fig. 2 is an enlarged, longitudinal, central section through the bleeder valve per se entirely removed from association with the remaining parts of the hydraulic brake system.

The tension of spring 38 will yieldably maintain valve 36 against seat 34 as shown in Fig. 2; but, when fluid and air is being removed from the hydraulic system by depressing the brake pedal of the automobile, said valve 36 is forced from seat 34 and against the pressure of spring 38 to allow a desired amount of fluid and air to pass through a section of bore 32 and passage 42 and thence to hose 22. When the brake pedal is released, spring 38 will return valve 36 to a place against seat 34 and as illustrated in Fig. 2 to insure that no air or foreign matter will be drawn into the hydraulic system.

When the system has been purged of objectionable air pockets, hose 22 may be removed and dust plug 48 positioned as shown in Fig. 4, after which the entire bleeder valve 10 is turned into a place where surface 28 rests against its seat to positively close bore 32 against the possible passage of fluid therethrough.

It will be apparent from the foregoing that the check valve assembly within the bleeder valve 10 and including valve 36, spring 38 and plug 40 will permit a one-man purging of air from the hydraulic system of an automobile with which the valve embodying my invention is associated. Thus, when breakes of an automobile become faulty or weak due to the presence of an air pocket, the driver may recondition the hydraulic system while on the road and not suffer the necessity of driving to a service station where two men would be available to complete the job.

The specific details of construction illustrated in the drawing and defined in the foregoing specification are employed for the purpose of an example only; and, since modifications may be made thereto, without departing from the spirit of the invention, it is desired to be limited only by the scope of the appended claim.

Having thus described the invention, what is claimed as new and desired to be secured by Letters Patent is:

As an article of manufacture for use as a permanent part of a hydraulic brake system having an internally threaded outlet opening provided with an internal seat therein, a combination closure and bleeder valve assembly adapted for permanent, shiftable mounting in said opening, said assembly comprising an elongated body having a frusto-conical, external surface on one end thereof, a horse-receiving head on the opposite end thereof, a set of external threads intermediate the ends thereof adjacent said surface, a wrench-receiving section intermediate said threads and said heads, a longitudinal bore extending through said head, section and threads and terminating in spaced relation to said one end, and a lateral bore extending into the body between said surface and said threads to a point of communication with said longitudinal bore, said longitudinal bore being provided with a set of internal threads within the head and the section, an intermediate seat-presenting shoulder within said external threads and a smooth stretch between said shoulder and said internal threads; a valve element within the longitudinal bore and provided with a conical face adapted for engagement with said shoulder to close said longitudinal bore; a tubular plug having a passage therethrough, said plug being externally threaded and adjustably and removably received with said longitudinal bore by said internal threads of the latter; and a coil spring within said stretch, said spring extending between and being secured to the plug and the element for yieldably biasing the latter into seated engagement on the shoulder, whereby the assembly may be permanently installed in said opening of said system by engagement of said external threads of the body with the internal threads of said opening and may be alternately shifted between a closing position disposing said surface in sealing engagement with said seat and a bleeding position disposing said lateral bore in communication with said opening.

References Cited in the file of this patent

UNITED STATES PATENTS

| | | |
|---|---|---|
| 2,046,228 | Wiedmann | June 30, 1936 |
| 2,064,573 | Tatter | Dec. 15, 1936 |
| 2,069,606 | Gary | Feb. 2, 1937 |
| 2,209,784 | Maack | July 30, 1940 |
| 2,256,516 | Carlin | Sept. 23, 1941 |
| 2,611,387 | Legerski | Sept. 23, 1952 |

FOREIGN PATENTS

| | | |
|---|---|---|
| 2,532 | Great Britain | Feb. 1, 1899 |
| 995,099 | France | Oct. 14, 1951 |